March 6, 1945. G. A. MOORE 2,370,680
CONTAINER AND METHOD OF MAKING SAME
Filed Dec. 4, 1941 2 Sheets-Sheet 1
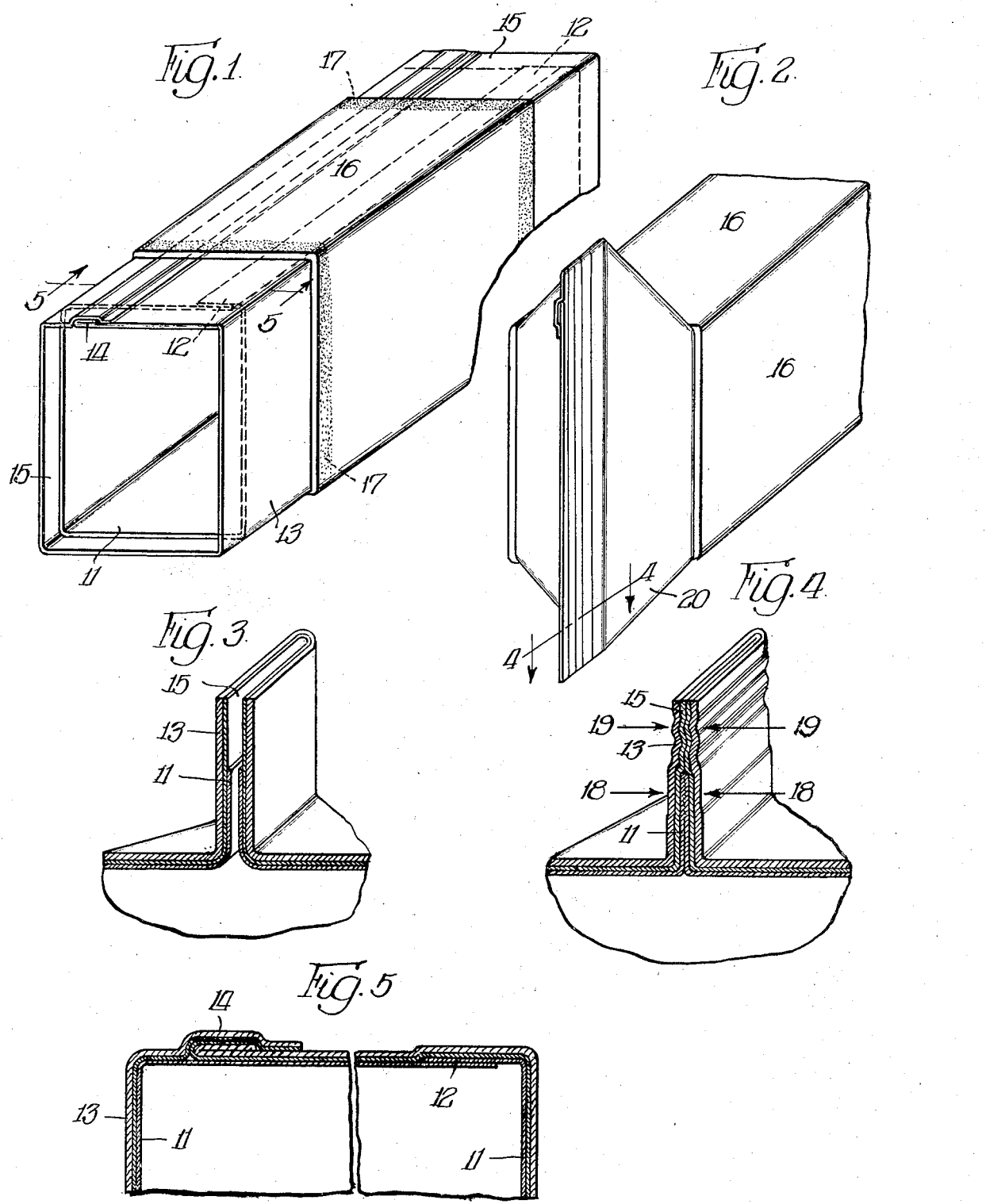
INVENTOR.
George Arlington Moore,
BY
Cromwell, Greist & Warden
ATTYS.

March 6, 1945.  G. A. MOORE  2,370,680
CONTAINER AND METHOD OF MAKING SAME
Filed Dec. 4, 1941  2 Sheets—Sheet 2
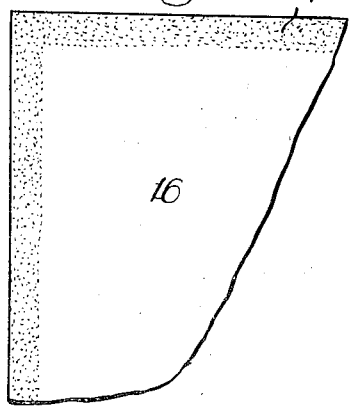
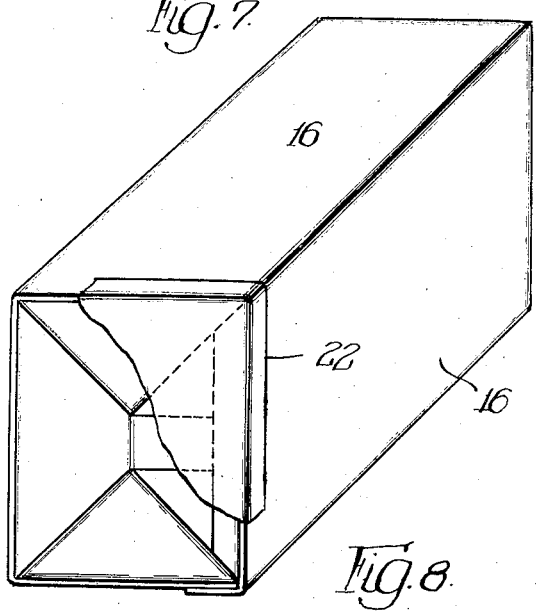
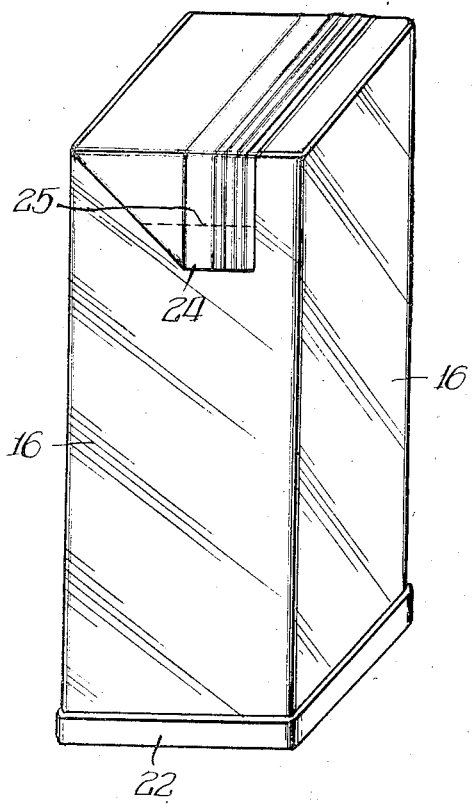
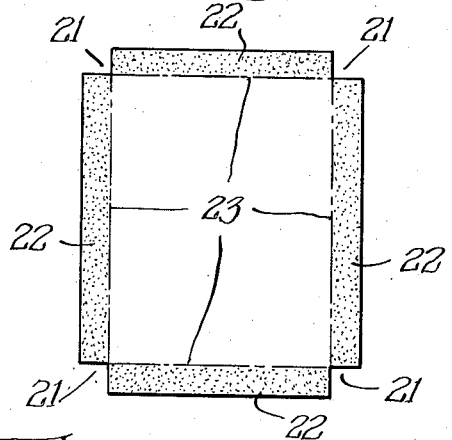
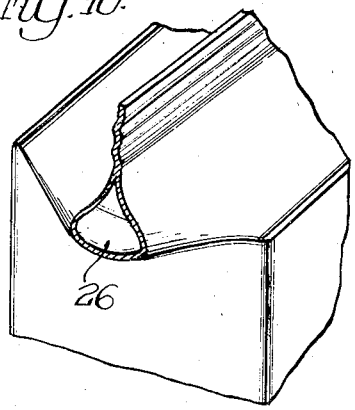
INVENTOR.
George Arlington Moore,
BY
Cromwell, Greist & Warden
ATTYS

UNITED STATES PATENT OFFICE 2,370,680

CONTAINER AND METHOD OF MAKING SAME

George Arlington Moore, New York, N. Y., assignor to Shellmar Products Company, Mount Vernon, Ohio, a corporation of Delaware Application December 4, 1941, Serial No. 421,589

6 Claims. (Cl. 229—3.5)

The present invention relates to improvements in containers and, more particularly, to improvements in flexible reinforced containers and methods of forming the same which are especially adaptable for use in storing and transporting measured quantities of liquid and semi-solid food products as well as other similar types of industrial commodities.

While various types of containers for transporting such commodities have heretofore been used in which a reinforced type of liner such as, for example, rubber hydrochloride material of the type known in the trade as "Pliofilm" have been adopted, the inherent hazards in the construction of such liquid-carrying containers are well known. Often minute ruptures in such materials and their seam structures have proven to be disastrous in a commercial sense and while the seam structures may be constructed in a manner so as temporarily to prevent actual leakage of the liquid nevertheless, the slightest inequality in seam structure can cause absorption of contents thereby destroying the commercial value of such containers.

Generally, it is an object of the present invention to overcome these as well as other disadvantages and difficulties and to provide containers which are economical of manufacture, durable of construction and which will remain free from defects of the type above mentioned.

A principal object of the present invention is to construct a container in which the fabricating steps provide inner linings of thermoplastic material which can be thermoplastically sealed independently of the secondary enveloping fabricating material and reinforcing structures and their requisite seams.

More specifically, an object of the present invention is to provide a container and method of forming the same whereby the primary materials forming the inner liners thereof are effected with independent seams fabricated within secondary materials similarly independently seamed to the end that these materials can more readily be reinforced with more rigid materials forming the side walls, end walls and base of the container.

Another object of the invention is the provision of a container having an inner liner of a thermoplastic material and an intermediate liner of a rubber hydrochloride material, each of which has longitudinal seams remotely placed from each other.

Another object of the invention is the provision of such a container in which the end closures are formed by contacting extensions of the liner materials composed of layers of dissimilar thermoplastically treated webs so that a primary seal can be effected between the contacting faces of the inner liner and a secondary seal of the intermediate liner at increased temperatures at the points of contact to form hermetically sealed end closures.

A further object of the invention is to provide a container in which heat applied to the outer portions of the liner margins passes through the outer members and into the lining materials to activate the same to provide a firm and tight seam of a primary nature and to prevent noxious and contaminating gases from finding their way to the commodities of the container.

Still another object of the invention is to provide a container having at least one lining material reinforced by a more rigid material which is adhesively affixed thereto and after an end closure has been formed by hermetically heat-sealing the same and affixing to an end closure a further reinforcing rigid material to the container to prevent undue sagging or bulging of the folds constituting the bottom closure.

Other objects of the invention will in part be obvious and will in part appear hereinafter.

The invention accordingly comprises the several steps and the relation of one or more of such steps with respect to each of the others, and the container possessing the features, properties, and the relation of elements, which are exemplified in the following detailed disclosure and the scope of the application of which will be indicated in the claims.

For a fuller understanding of the nature and objects of the invention, reference should be had to the following detailed description taken in connection with the accompanying drawings, in which:

Fig. 1 is a perspective view of the invention illustrating a preferred embodiment of a tubular formation of the various materials;

Fig. 2 is a perspective view of a fragmentary portion of the end of a container illustrating a subsequent step in the formation of an end closure seam;

Fig. 3 is a fragmentary sectional view taken through the end seam of a container prior to the sealing operation;

Fig. 4 is a perspective view similar to that depicted in Fig. 3 and taken along the lines 4—4 of Fig. 2 and looking in the direction of the arrows illustrating the method of effecting a primary and a secondary seal;

Fig. 5 is a cross-sectional view with parts broken away taken along the line 5—5 of Fig. 1, looking in the direction of the arrows and showing the remote relationship of the longitudinal seam of each of the lining materials;

Fig. 6 is a plan view of a fragmentary portion of the reinforcing member constituting the end and side walls of the container;

Fig. 7 is a perspective view showing a sealed end closure inwardly folded with a reinforcing bottom cap applied thereto, a major portion of which has been broken away for clearness in illustration;

Fig. 8 is a plan view of a proposed type of bottom reinforcing cap;

Fig. 9 is a perspective elevation of a preferred form of a completed container; and Fig. 10 is a fragmentary perspective view of a corner of a container showing the top closure in elevated position and a portion thereof removed to form a pouring spout.

Referring more particularly to Fig. 1 of the drawings it will be seen that there has preferably been provided sheet liner 11 having a thermoplastic material such as, for example, waxed glassine folded into tubular form with the free marginal portions disposed in overlapping relation to form a longitudinal seam 12. Being of a thermoplastic nature, the materials between this seam may readily be heat sealed by the application of heat and pressure along the area of the overlap.

Folded about this first tubular construction (which has preferably been folded around a mandrel or other suitable form not shown) a second sheet 13 of material such as rubber hydrochloride material or "Pliofilm" is similarly folded to encompass the first tubular formation. This sheet or web may be of the type of material which has been laminated to a sheet of paper and after it encompasses the first layer or inner lining material 11 it, too, is formed into a seam at its free overlapping marginal portions to form a second longitudinal seam as indicated at 14. Preferably, in forming this particular seam, one portion of the marginal edge is folded back upon itself and because the thermoplastic surface constitutes the inner portion it exposes to the corresponding overlapping portion a similar surface of the thermoplastic material which also has an extension edge going beyond the back-fold. Heat and pressure applied to this longitudinal seam forms an hermetic seal. A seal of this type is more fully described and claimed in my copending application, Serial No. 373,458, filed January 7, 1941, now Patent No. 2,333,330. It should be noted that this secondary web of material is somewhat larger in over-all area than the web 11 so that when the secondary web is folded around the first blank, there remains a marginal end extension portion more fully indicated at 15.

While the mandrel is still in place within these tubular formations, a reinforcing material 16 of suitable rigidity, such as paperboard, is also folded about an intermediate portion of the tubular formations. It should be noted that this reinforcing board has had marginally applied thereto a thermoplastic heat-sealing material such as for example, a hot-melt adhesive on the surface which contacts the tubular formation as indicated by the stippling 17 as well as on the outer surface of one marginal portion forming the marginal overlap joint. This marginal overlap of the reinforcing material is depicted in Fig. 7. Heat applied with pressure to the area of the reinforcing member containing the thermoplastic material will cause it to become activated whereupon it will become adhesively united, in those areas so treated, to the tubular formation.

The formed body, or mandrel, is now moved to a point adjacent an end edge of the reinforcing material 16 and the tubular formation extending therebeyond is then pinched together so that the opposing faces are brought adjacent each other as more clearly shown in the fragmentary portion in Fig. 3. Here it will be seen that the wax paper lining is brought into face-to-face relationship and that the extending portion 15 of the secondary material 13, because of its extending marginal portion, is similarly brought into face-to-face relationship. In this condition the container is set up to be sealed to form an end closure by the application of heat and pressure. By means of suitable sealing irons (not shown) a primary seal is first effected as indicated generally at 18, 18, and substantially immediately thereafter a secondary seal is similarly effected by bringing coacting sealing irons against the outer layer as indicated generally at 19, 19. This seal runs along the entire marginal edge of the pinched portion and somewhat away from the adjacent bottom wall of the container formation. The amount of heat and pressure, but particularly the heat, applied to the waxed liner is insufficient to activate the rubber hydrochloride material but is adequate to activate the waxed material. For example, the heat required to activate the rubber hydrochloride is much too great properly to activate the wax and therefore the two seams must have their own relative temperatures and pressures to produce a suitable seam. It is sufficient to state that in performing this compound sealing operation the wax will melt at about 125° F. whereas the rubber hydrochloride requires in the neighborhood of about 300° F. Effecting such a primary or blocking seal has a particular advantage in that it prevents gases activated and generated by the secondary sealing operation from passing between the folds or pinched portion of the extension and finding their way into the contents of the container in effecting the final closing seaming operation so that such commodities as milk, cream, etc. do not thereby become contaminated.

Having performed the sealing operation to bring about the closure of one end portion, or bottom wall, of the container the sealed area is next folded downwardly against the container and the protruding end portions 20 are then folded over and inwardly toward the center of the container in the direction of each other and down upon the sealed portion as more fully illustrated in Fig. 7.

In order to insure that the container in this condition will adequately serve the purpose of holding liquids of varying degrees of specific gravity the bottom of the container is preferably reinforced with a supplemental reinforcing material or closure cap of the type shown in Fig. 8. This material may be similar to that of the body reinforcing material and can be stamped out of a blank in the form shown. This blank is preferably corner notched as indicated at 21 to form marginal flaps 22 which can readily be bent upwardly along crease lines 23. These flaps should have applied thereto a thermoplastic heat-sealing adhesive similar to that with which the body reinforcing portion has also been marginally subjected. In this condition the bottom reinforcing blank is applied to the bottom of the container where it is upwardly folded and these marginal portions may then be adhesively heat-sealed against the sides and ends of the lower marginal portion of the reinforcing material.

After the container has been filled the mouth thereof, provided by the other extension portions of the tubular formation extending beyond the edge of the reinforcing member, are similarly formed, i. e. squeezed or pinched together as was the bottom portion whereupon they are subjected to a similar primary and secondary heat-sealing operation and thereafter this end closure may similarly be folded against the container. However, it is preferred that the extending portions 24 be folded downwardly along the sides of the container as shown in Fig. 9. When the container is ready for use one of these extending portions may have an edge thereof removed in any suitable manner as by tearing or cutting as indicated along the dotted line 25 shown in Fig. 9 so that a pouring spout 26 will be formed as shown in Fig. 10.

Where rubber hydrochloride material is used, it has been found that it is very difficult to tear through such material. A suitable method for performing this function is to attach a tearing clip to the end portion 24 such as that disclosed and claimed in my copending application, Serial No. 344,255, filed July 6, 1941, now Patent No. 2,305,631.

There is a wide use for a container fabricated in the manner shown in the accompanying drawings and described herein. It should be noted that while the present container is particularly adapted for the use of liquid and semi-solid food products, such as for example, milk, cream, salad oil, cottage cheese, hydrogenated oil, etc., it can also be used with great success for lubricating oils and other such industrial commodities. Where food products are packaged it is preferable to have the inner liner of a wax-like material which does not impart any characteristic odors to the food. With respect to industrial commodities such as mentioned above, this wax liner may be omitted or replaced with more suitable materials.

It will thus be seen that the objects hereinbefore set forth may be readily and efficiently attained and since certain changes in carrying out the above method and certain modifications in the container construction embodying the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent, is:

1. A method of forming a container, comprising in combination, folding a sheet of waxed lining material to form a tube having a marginal overlap, heat-sealing the overlap to form a longitudinal seam, folding a larger sheet of laminated paper and rubber hydrochloride material around said lining material with the rubber hydrochloride facing innermost to expose marginal portions of the larger sheet at each extremity of the tube and to obtain a second marginal overlap remote from said first named overlap, heat-sealing said second overlap to form another longitudinal seam, providing a reinforcing paper board material having a predetermined stripe of thermoplastic hot-melt adhesive and folding the same about an intermediate portion of said tube with a marginal overlap, heat-sealing said reinforcing member in the region of said predetermined stripe to form a third longitudinal seam to complete the tube and to affix the reinforcing material to the body thereof, folding the materials at one end of the tube extending beyond the reinforcing material so that the wax liner and the rubber hydrochloride surpluses are brought in face-to-face contact with themselves, effecting a primary seal in the region of said face-to-face wax area, effecting a secondary seal of said face-to-face rubber hydrochloride area at increased temperature, folding said sealed portion inwardly to form a bottom closure, providing a reinforcing paper base board having a predetermined marginal stripe of thermoplastic hot melt adhesive to said bottom closure, heat-sealing said marginal area against the sides of said container and, after filling said container through the remaining open portion, similarly sealing the same as said bottom closure and folding the sealed portion against the top and sides of the container.

2. A container, which comprises in combination a folded sheet of waxed lining material formed into a tube having a marginal overlap, said overlap being heat-sealed to form a longitudinal seam, a larger sheet of laminated paper and rubber hydrochloride material being folded around said lining material with the rubber hydrochloride facing innermost exposing marginal portions of said larger sheet at each extremity of the tube and having a second marginal overlap remote from said first named overlap, said second overlap being heat-sealed to form another longitudinal seam, a reinforcing paper board material having a predetermined stripe of thermoplastic hot melt adhesive being folded about an intermediate portion of said underlying tubular formation and having a marginal overlap, said reinforcing member being heat-sealed at said overlap and in the region of said predetermined stripe forming a third longitudinal seam to complete said tubular formation and to affix said reinforcing material to the underlying portion of said laminated paper and rubber hydrochloride material, the materials at one end of the tube extending beyond the reinforcing material being folded so that the wax liner and rubber hydrochloride surpluses are brought in face-to-face contact with themselves, said face-to-face wax area having a primary block seal and said face-to-face rubber hydrochloride area having a secondary seal, said sealed portions being inwardly folded to provide a bottom closure, a reinforcing paper base board having a predetermined marginal stripe of thermoplastic hot melt adhesive being affixed to said reinforcing paper board material and confining said bottom closure in concealed position, said marginal areas being heat-sealed against the sides of said container, said container when filled through the remaining opening being adapted similarly to be sealed across said opening and to be folded to form a top closure.

3. A method of forming a container, comprising in combination, folding a sheet of heat-sealable lining material to form a tube having a marginal overlap, heat-sealing the overlap to form a longitudinal seam, folding a larger sheet of laminated paper and rubber hydrochloride material around said lining material with the rubber hydrochloride facing innermost to expose marginal portions of the larger sheet at each extremity of the tube and to obtain a second marginal overlap, heat-sealing said second overlap to form another longitudinal seam, providing a reinforcing paperboard material having predetermined stripes of thermoplastic adhesive thereon and folding the same about an intermediate portion of said tube and with a marginal overlap, heat-sealing said reinforcing member in the region of said predetermined stripes of adhesive to form a third longitudinal seam to complete the tube structure and to affix the reinforcing material to the body portion thereof, folding the materials at one end of the tube extending beyond the reinforcing material so that portions of the heat-sealable liner material and the rubber hydrochloride surpluses are brought in face-to-face contact with themselves, effecting a seal in the region of said face-to-face contacting areas, folding said sealed portion inwardly to provide a bottom closure, filling said container with a food product through the open end thereof, squeezing the open end to bring opposite faces of said liner material and said rubber hydrochloride together respectively in face-to-face contact, heat-sealing said contacting faces of liner material by an amount of heat and pressure surrounding the area of contact of said liner material which is less than the amount required to fuse rubber hydrochloride but sufficient to form a primary block seal against penetration of gases, subsequently generated, from reaching said food product, and substantially simultaneously applying heat and pressure to the area surrounding said contacting faces of rubber hydrochloride to form a secondary hermetic seal across the top of said resulting package.

4. A container, which comprises in combination, a folded sheet of heat-sealable lining material formed into a tube having a marginal overlap, said overlap being sealed and providing a longitudinal seam, a larger sheet of laminated paper and rubber hydrochloride material being folded around said lining material with the rubber hydrochloride facing innermost exposing marginal portions of said larger sheet at each extremity of the tube and having a second marginal overlap at the remaining free ends, said second overlap being heat-sealed to form another longitudinal seam, a reinforcing paperboard material having predetermined stripes of thermoplastic adhesive being folded about an intermediate portion of said underlying tubular formation and having a marginal overlap, said reinforcing member being heat-sealed at said overlap and in the region of said predetermined stripes of adhesive providing a third longitudinal seam to complete said tubular formation and affixing said reinforcing material to the body of said tubular formation, the materials at one end of the tube extending beyond the reinforcing material being folded so that the liner and rubber hydrochloride surpluses are brought in face-to-face contact with themselves, said face-to-face contacting areas being heat-sealed to provide a bottom closure for said container, the body of said container being filled with a food product, the remaining end of said container being squeezed together with opposite faces of said liner material and said rubber hydrochloride respectively being in face-to-face contact, said contacting faces of liner material being heat-sealed and providing a primary block seal against the penetration of gases generated in subsequent sealing operations from contaminating said food product, and said contacting faces of said rubber hydrochloride being heat-fused together to form a secondary hermetic seal across the top of said package.

5. In a method of fabricating an hermetically sealed container from a web of heat-sealable liner material having a wrap of heat-fusible material containing a food product hermetically sealed therein and being free from food contaminating gases resulting from the heat-fusing operation of sealing the mouth of the container, comprising folding a web of liner material to form a tube having a marginal overlap and heat-sealing the same to provide a longitudinal seam, folding a larger web of rubber hydrochloride as a wrap around said lining material with marginal ends thereof extending beyond the ends of the lining material with the remaining free ends forming a marginal overlap, and heat-sealing said overlap to form a second longitudinal seam to provide a lining encompassing tube, squeezing one end of said tube together to bring opposite faces of said liner material and said rubber hydrochloride together respectively in face-to-face contact, and heat-sealing the same to provide an hermetic bottom seam and a bottom wall thereby forming said tubular structure into a container, folding said bottom seam against said bottom wall, filling said container with a food product through the open end thereof, squeezing the open end of said container together to bring opposite end of said liner material and said rubber hydrochloride together respectively in face-to-face contact, heat-sealing said contacting faces of liner material together by an amount of heat and pressure, surrounding the area of contact of said liner material, which is less than the amount of heat required to fuse rubber hydrochloride but sufficient to form a primary block seal against gases generated in a subsequent sealing action from reaching said food product, and substantially simultaneously applying heat and pressure to the material surrounding said contacting faces of rubber hydrochloride to form a secondary hermetic seal across the top of said package.

6. In a hermetically sealed container fabricated from webs of heat-sealable liner material having a wrap of heat-fusible material containing a food product hermetically sealed therein and being free from food contaminating gases resulting from the heat-fusing operation of sealing the mouth of the container, comprising a web of lining material folded to provide a tube having a marginal heat-sealed overlap providing a longitudinal seam, a larger web of rubber hydrochloride as a wrap encompassing said lining material having marginal ends thereof extending beyond the ends of the lining material with the remaining free ends forming a marginal overlap and being heat-sealed into a longitudinal seam forming a lining encompassing tube, one end of said tube being squeezed together with opposite faces of said liner material and said rubber hydrochloride respectively being in face-to-face contact, being heat-sealed and providing an hermetic bottom seam and wall with the remaining portions of the tubular structure constituting a container, said container having a food product therein free of contaminating gases generated in subsequent sealing operations, the remaining end of said container being squeezed together with opposite faces of said liner material and said rubber hydrochloride respectively being in face-to-face contact, said contacting faces of said liner material being heat-sealed and providing a primary seal against infiltration of gases generated in subsequent sealing operations of said seam, and said contacting faces of rubber hydrochloride being heat-sealed where they are in face-to-face contact to form a secondary hermetic seal across the top of said package.

GEORGE ARLINGTON MOORE.